UNITED STATES PATENT OFFICE.

OSWIN W. WILLCOX, OF DOVER, NEW JERSEY.

YEAST-WORT AND METHOD OF PRODUCING THE SAME.

1,044,615.  Specification of Letters Patent.  Patented Nov. 19, 1912.

No Drawing.  Application filed April 29, 1912. Serial No. 693,944.

*To all whom it may concern:*

Be it known that I, OSWIN W. WILLCOX, a citizen of the United States, residing at Dover, in the county of Morris and State of New Jersey, have invented certain new and useful Improvements in Yeast-Wort and Method of Producing the Same; and I do hereby declare the following to be a full, clear, and exact description of the invention, such as will enable others skilled in the art to which it appertains to make and use the same.

The present invention relates, generally, to a novel composition of ingredients providing a wort for the culture, production and manufacture of yeast, and the invention also relates to the novel process or method of producing said wort.

The present invention has for its principal object to provide a process whereby waste sulfite liquor, which in its original condition is unsuitable for yeast manufacture, is subjected to appropriate chemical treatment and addition of chemicals, whereby a novel and suitable medium or wort adapted to support the vigorous maximum growth and development of culture yeast is obtained.

As is well known, in the sulfite process of paper manufacture, wood, in the form of chips, is placed in an apparatus called a digester, wherein it is subjected to a cooking process in the presence of a solution of calcium sulfite produced by passing gaseous sulfur dioxid into a mixture of lime and water. In the course of this cooking process the lignin substances of the wood are dissolved, leaving the cellulose of the wood in a form suitable for paper making. After the mass of wood has been thus cooked, it is removed from the digester into a tank, from whence the sulfite solution, containing the matters it has dissolved from the wood, is allowed to drain off from the wood pulp. This waste sulfite liquor is generally thrown away, or allowed to drain off into a stream in the neighborhood of the paper or pulp mill. This waste sulfite liquor contains a certain amount of fermentable sugars and potassium salts, which renders it, when subjected to suitable chemical treatment and the addition of suitable chemicals, a favorable base for the production of a wort for yeast manufacture. A typical example of such waste sulfite liquor contains about 1.89% of fermentable sugars, and a mineral ash consisting largely of calcium salts but containing potassium salts equivalent to about 1.1% potassium oxid. The fermentable sugars and potassium salts are elements favorable to yeast production. This waste sulfite liquor, however, contains fairly large amounts of bisulfite of lime and free sulfurous acid, both of which are strong yeast poisons, so much so that when present in such amounts as normally contained in the waste sulfite liquor, neither yeast, molds nor bacteria can grow therein. In its original or normal condition therefore the waste sulfite liquor, while containing some elements favorable to the composition of a yeast wort, is wholly unsuitable for yeast culture or production, and requires chemical treatment and addition of chemicals which will destroy its toxic properties toward yeast. Not only must the toxicity be removed, but there must also be added to the liquor further elements which the yeast must have if it is to grow and multiply to its fullest capacity. The absent elements which are lacking in the waste sulfite liquor are nitrogen and phosphoric acid in suitable form and amount, only slight traces of which exist in the normal constituency of the waste sulfite liquor.

The first step, then, in making the waste sulfite liquor suitable for a wort to be used in yeast manufacture, is to bring down or reduce its acidity to within proper limits, and at the same time secure the introduction of nitrogen in suitable form and amount. By bringing down or reducing the acidity of the waste sulfite liquor within proper limits, I mean, that the acidity of the waste sulfite liquor need not be entirely neutralized, but that a slight amount of acidity may be left, for example the acidity may be neutralized to within 0.2%, expressed as ammonium bisulfite. The reason for leaving this slight amount of acidity is that culture yeast is indifferent to the small amount of ammonium bisulfite involved, while, on the other hand, the presence of this small amount of ammonium bisulfite prevents the growth and development of wild yeasts and undesired bacteria, the result being that the yeast crop propagated in the wort so constituted is practically pure, and is not so easily subject to spoilage and deterioration as the yeast grown or developed in a wholly neutralized waste sulfite liquor. In proceeding to carry out this first step in the preparation of the waste sulfite liquor as a wort, in other words, to neutralize the liquor to the extent above indicated, I add ammonia in the form of aqua ammonia or liquid ammonia. The effect or chemical action of this addition is to partially neutralize the acidity of the waste sulfite liquor, and to add thereto the requisite quantity of nitrogen. The amount of ammonia necessary will vary according to the circumstances, and is to be determined by the amount of fermentable sugars present and the free acidity in the waste sulfite liquor to be treated. My aim is to always introduce nitrogen, in the form of ammonia, to the amount of about 5% of the dry weight of the yeast crop expected. Thus, for example, to obtain a yield of compressed yeast equivalent to 20% of the weight of the fermentable sugars present in the solution, I would employ an amount of nitrogen, in the form of ammonia, equal to about 0.25% of the weight of the fermentable sugars. When, as the result of experiment, I find that the addition of larger quantities of ammonia results in an increased yield of yeast, I increase the minimum amount of ammonia to be added; and, conversely, when I find that a smaller quantity of nitrogen will give the same yield of yeast, I lower or reduce the amount of ammonia to be added, always bearing in mind that the yeast is to be supplied with nitrogen, in the form of ammonia, in no less quantity than it can assimilate under conditions favorable for obtaining the yeast crop expected. I regard, however, the 0.25% ratio of nitrogen to the fermentable sugars, as above indicated, to be the practical minimum of nitrogen to be added in order to produce a wort most favorable to yeast development, and the maximum production of new cells.

The acidity of the waste sulfite liquor may be first reduced by adding aqua ammonia or liquid ammonia in sufficient quantity to reduce the acidity to the required point, that is to neutralize the free acidity to within 0.2%. If such added ammonia is not sufficient to supply the necessary amount of nitrogen, I complete the necessary amount of the latter by the addition of some neutral salt of ammonia, such as ammonium sulfate or ammonium chlorid, which while adding to the amount of nitrogen will not disturb the balance of acidity desired to be maintained in the solution. If, however, to neutralize the sulfite liquor to the desired balance of acidity requires more ammonia than is needed for the yeast crop expected, I first partially neutralize the acidity with lime, or carbonate of lime, and then finish the neutralization to within the required limits by ammonia sufficient to also supply the requisite amount of nitrogen.

The next step in preparing the waste sulfite liquor as a wort for the manufacture of yeast is to add to the neutralized and nitrogen-supplied solution, obtained as above described, an amount of phosphoric acid sufficient to meet the requirements of the yeast crop expected. Yeast contains about 3% of phosphoric acid on the average, so in order to secure an amount of compressed yeast equivalent to 20% of the weight of the fermentable sugars contained in the wort, (maintaining by way of example the illustrative quantity of the yeast crop above mentioned) I add phosphoric acid to the amount of about 0.16% of the weight of the fermentable sugar contained in the solution. As in the case of the nitrogen, this proportional amount of phosphoric acid may be raised or lowered as experience shows is advisable in view of the amount and quality of the yeast crop desired. The phosphoric acid may be added in the form of free phosphoric acid, or in the form of one of its salts, such as calcium salts of phosphoric acid, sodium salts of phosphoric acid, ammonium salts of phosphoric acid, or in general the combination of phosphoric acid with any soluble, non-poisonous alkaline or alkaline earth base. The increased acidity of the solution or wort, due to the addition of the phosphoric acid or acid salts thereof is allowed for when neutralizing the waste sulfite liquors as above described, so that the proper balance of acidity is finally maintained in the completed wort. After having thus given the sulfite liquor a composition requisite to provide the novel yeast wort, I now proceed to pitch the wort with a suitable quantity of seed yeast, preferably equal to about 20% or 25% of the amount of compressed yeast expected. After thus pitching the liquor or wort with the seed yeast, I then subject the liquor or wort to aeration, the amount and duration of the aeration being increased or diminished according as I desire a larger or smaller crop. After the yeast crop has become ripe, I then proceed to separate it from the liquor in the usual manner, wash it, and form it into the usual trade packages.

While the steps in the process of preparing the yeast wort, as above described, and the amount of additional elements added to the waste sulfite liquor to constitute the wort, may be varied, as will be clearly evident from the above description, it must be clearly understood that the gist of my invention is the use and treatment of waste sulfite liquors, both in the composition of and the preparation of a wort suitable for yeast production, and manufacture, and in so doing providing a use for a waste material, as well as securing a very cheap, efficient and desirable wort in which yeast may be cultured and developed, and in which the yeast may produce the maximum number of new cells.

I claim:—

1. In the preparation of waste sulfite liquors to produce a yeast wort, the addition of ammonia to reduce the acidity of the sulfite liquor and to supply nitrogen, and the addition of phosphoric acid or a salt thereof.

2. In the preparation of waste sulfite liquors to produce a yeast wort, first reducing the acidity of the waste sulfite liquor with ammonia, increasing the proportion of nitrogen by adding ammonium salts, and then adding phosphoric acid or a salt thereof.

3. In the preparation of waste sulfite liquors to produce a yeast wort, first partially neutralizing the acidity of the waste sulfite liquor with lime, finishing the neutralization of acidity of the waste sulfite liquor to within the required limits with ammonia adapted to also supply a requisite amount of nitrogen, and then adding a requisite amount of phosphoric acid or salts thereof.

4. A yeast wort comprising the composition of a partially acid neutralized waste sulfite liquor, ammonium salts, and phosphoric acid or a salt thereof.

5. A yeast wort comprising partially neutralized waste sulfite liquor containing fermentable sugars and potassium salts, nitrogen in the form of ammonium salt equal to 0.2% of the weight of fermentable sugar, and phosphoric acid equal to 0.16% of the weight of fermentable sugar, substantially as described.

In testimony that I claim the invention set forth above I have hereunto set my hand this 24th day of April, 1912.

OSWIN W. WILLCOX.

Witnesses:
 GEORGE D. RICHARDS,
 MAYBELLE McADOO.